US00RE33842E

United States Patent [19]

Ebentheuer

[11] E Patent Number: Re. 33,842

[45] Reissued Date of Patent: Mar. 10, 1992

[54] TRASH BAG ASSEMBLY AND HOLDER

[76] Inventor: Richard H. Ebentheuer, 15240 Septo St., Mission Hills, Calif. 91345

[21] Appl. No.: 560,834

[22] Filed: Jul. 31, 1990

Related U.S. Patent Documents

Reissue of:

[64] Patent No.: 4,783,031
Issued: Nov. 8, 1988
Appl. No.: 107,020
Filed: Oct. 13, 1987

[51] Int. Cl.[5] ..... A63B 55/04
[52] U.S. Cl. ..... 248/97; 312/258
[58] Field of Search ..... 248/97, 99, 95, 98, 248/101, 178, 166, 165, 434, 172, 150; 403/43; 312/258, 5, 6

[56] References Cited

U.S. PATENT DOCUMENTS

| | | | |
|---|---|---|---|
| 1,799,537 | 4/1931 | Schindler | 248/97 |
| 3,091,422 | 5/1963 | Hobbs | 248/101 |
| 3,162,414 | 12/1964 | Maschek | 248/101 |
| 3,374,976 | 3/1968 | Kurlander et al. | 248/97 |
| 3,412,965 | 11/1968 | Alexander | 248/101 |
| 3,603,541 | 9/1971 | Sturm et al. | 248/150 X |
| 4,157,801 | 6/1979 | Elmer | 248/97 |
| 4,199,123 | 4/1980 | Weber et al. | 248/434 |
| 4,562,983 | 1/1986 | Klefbeck | 248/97 |
| 4,638,967 | 1/1987 | MacDuffe | 248/97 |
| 4,667,912 | 5/1987 | DeVilbiss | 248/97 |
| 4,783,031 | 11/1988 | Ebenthewer | 248/97 |

FOREIGN PATENT DOCUMENTS

| | | | |
|---|---|---|---|
| 0469939 | 4/1969 | Switzerland | 248/166 |

*Primary Examiner*—Ramon O. Ramirez
*Attorney, Agent, or Firm*—Poms, Smith, Lande & Rose

[57] ABSTRACT

The trash bag assembly includes a flexible open-topped trash bag having a holder releasably disposed inside the trash bag and holding it up for easy insertion of trash thereinto. The holder includes a frame and trash bag clamps to lock the bag to the top of the holder. The frame has a horizontal portion supported on depending vertical legs with rounded bottoms. The horizontal portion is collapsable and includes four arms pivotably interconnected at opposite ends thereof. In the operative position they are at right angles to each other to form an open-centered square or rectangle. The arms and/or legs can be adjustable in size, as by telescoping or the use of turnbuckles, to fit various sizes of trash bags. The clamps may be channel-shaped bars mounted on top of the arms, and the pivotably interconnected corners of some or all of the arms can be releasably locked to hold the arms in their operative position. With the holder inside the bag, it can expand freely to its full size during filling. The frame is light in weight, durable and easily inserted into and removed from the bag.

22 Claims, 3 Drawing Sheets

FIG. 1
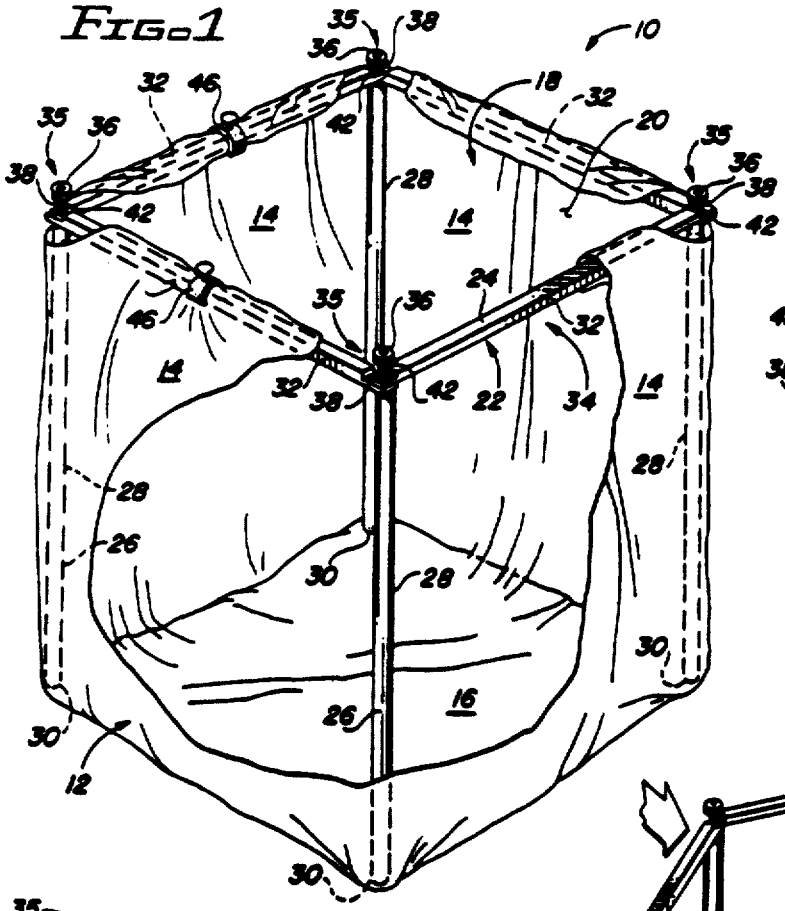
FIG. 2A
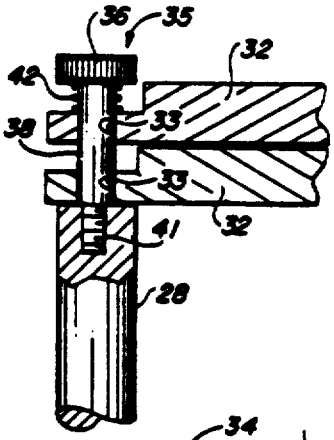
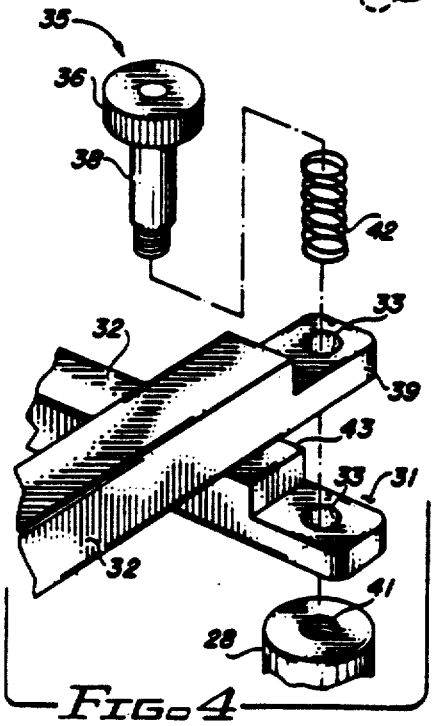
FIG. 4
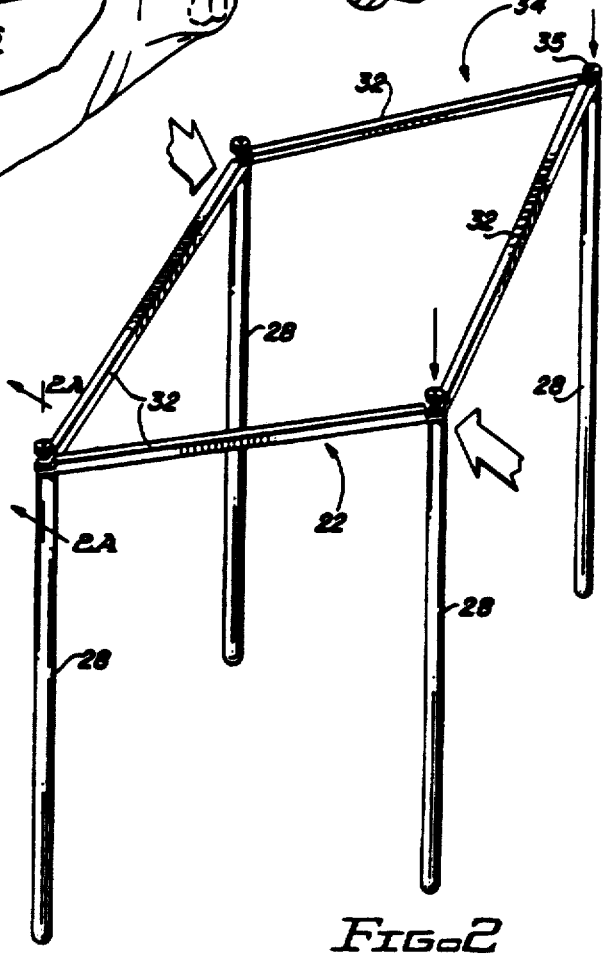
FIG. 2

TRASH BAG ASSEMBLY AND HOLDER

Matter enclosed in heavy brackets [ ] appears in the original patent but forms no part of this reissue specification; matter printed in italics indicates the additions made by reissue.

BACKGROUND OF THE INVENTION

1. Fiels of the Invention

The present invention generally relates to refuse holding equipment and, more particularly, to an improved trash bag and holder assembly.

2. Prior Art

Many types of trash bag filling stands, racks and supports have been provided in the past. See, for example, U.S. Pat. No. 4,576,350 wherein a multi-piped bag filling stand is shown which is of complicated construction and intended to support the outside of bags while they are being filled. See also U.S. Pat. No. 4,372,512 where an open bottomed wire bag support is shown for holding the exterior of grocery bags. Similarly, U.S. Pat. No. 4,174,085 illustrates an external frame around a trash bag. U.S. Pat. No. 4,467,989 is similar in contrast, as is U.S. Pat. No. 4,562,983, as well as U.S. Pat. Nos. 4,316,591, 4,620,683 and 4,307,861. U.S. Pat. No. 4,479,344 discloses a thin wire frame intended to hold open the mouth of a sack or bag while protruding above the bag and giving no vertical support to the bag.

There remains a need for an improved trash bag holder which holds the bag out to a sturdy uniform size from the inside of the bag while supporting it in an upright trash-receiving position, so that the bag can fill to its maximum size and configuration. The holder should support the bag to protect it from breaking and facilitate lifting and carrying the bag. Such holder should preferably fold up easily for easy stacking and storage and be adjustable in size to fit various trash bags. The holder should be sturdy and inexpensive and slip easily into and out of the trash bag, yet lock firmly to it.

SUMMARY OF THE INVENTION

The improved trash bag holder and assembly of the bag and holder satisfy all the foregoing needs. The holder and assembly are substantially as set forth in the Abstract.

Thus, the holder includes a frame having a horizontal portion and a vertical portion, the latter comprising four spaced depending legs with rounded bottoms. The legs are connected to the horizontal portion which comprises four arms pivotally interconnected at their ends to each other and moveable between a collapsed flat position and an operative open-centered square or rectangular position. Certain of the four corners of the horizontal portion contain releasable spring biased pin locks and the arms and/or legs preferably are adjustable, as by telescoping or through the use of turn buckles and the like.

Clamps may be releasably secured to the arms to releasably hold the top of the trash bag to the holder. The clamps may be in the form of channel-shaped bars which are pivoted to the tops of some of the arms. The clamps, arms and legs may be of plastic, wood, metal or the like and are durable and efficient.

Further features of the invention are set forth in the following detailed description and accompanying drawings.

DRAWINGS

FIG. 1 is a schematic perspective view, partly broken away, of a first preferred embodiment of the improved bag holder of the present invention and the assembly of the holder and bag in the fully operative position;

FIG. 2 is a schematic perspective view or the holder of FIG. 1 during collapse thereof to the stored position;

FIG. 2A is a partial cross-sectional view of a locking corner of the holder, in the collapsed configuration;

FIG. 4 is an enlarged exploded perspective view of one of the locking pin assemblies which can be employed in the holder of FIG. 1;

DETAILED DESCRIPTION

FIGS. 1–4

Figure 3:
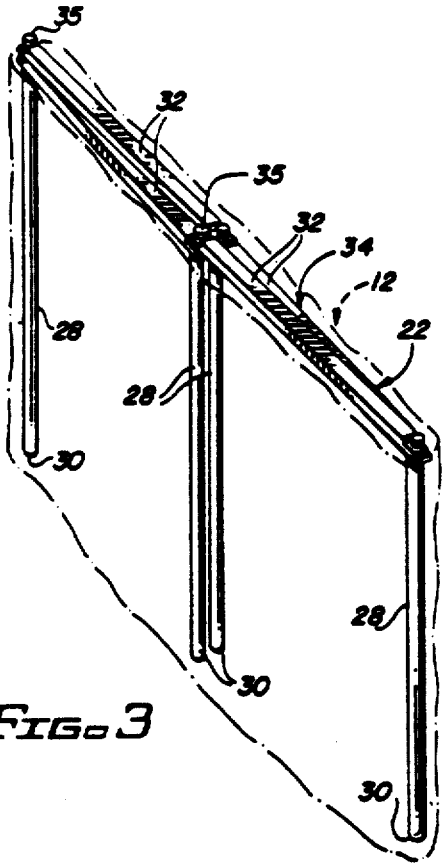
FIG. 3 is a schematic perspective view of the holder of FIG. 1 fully collapsed and inserted in the bag of FIG. 1, portions of the bag being shown in dotted outline.

Now referring more particularly to FIGS. 1–4 of the drawings, a first preferred embodiment of the improved trash bag holder and assembly of the present invention is schematically depicted therein. Thus, assembly 10 is shown which comprises a flexible trash bag 12 of paper, plastic, cloth or the like, having closed sides 14 and bottom 16 and an open top 18 defining a central trash-receiving space 20, within which an improved bag holder 22 is releasably disposed.

Holder 22 comprises a generally horizontal upper portion 24 supported on a vertical depending portion 26, the latter comprising four spaced vertical legs 28 having rounded bottoms 30 to prevent tearing of bag 12.

Legs 28 are connected to the underside of four arms 32 comprising portion 24. Arms 32 are pivotally interconnected at opposite ends thereof to form with legs 28 a frame 34 which is moveable between the operative position of FIG. 1 and the collapsed folded storage position of FIG. 3. FIG. 2 shows in an intermediate position during collapsing of frame 34. In the operative position of FIG. 1, arms 32 are at right angles to each other to form an open-centered four cornered square or rectangle with legs 28 at the four corners.

Arms 32 bear means which releasably lock them in the operative position. Such locking means may comprise, for example, as shown in FIG. 4, and FIG. 2A, pivot pins 35 having expanded heads 36 and vertical shafts 38, the latter extending through openings 33 in the corners of two overlapping arms 32 and secured as by screwing at 41 into leg 28. A coil spring 42 is disposed around shaft 38 to bias extension 39 downwards into the locked up position of FIG. 4. In this position extension 39 is disposed in a cut-out space 31 above extension 35 with extension 39 overlying and being in contact with extension 35. This prevents rotation of extension 39 relative to extension 35. However, when extension 39 is moved upwards to overcome the bias of spring 42, extension 39 is moved out of space 31, out of contact with extension 35 and above surface 43 of upper arm 32, thereby allowing extension 39 to be rotated horizontally relative to the associated extension 35 for moving of frame 34 to the collapsed storage position of FIG. 3.

It will be understood that other releasable locking means can be employed in place of that described to releasably hold arms 32 in the operative position of FIG. 1, a position in which frame 34 holds bag top 18 fully open and space 20 fully expanded. Bag 12 is held up around the outside of frame 34 by having the top 18 thereof trapped between one or more c-clamps 46 and the arms 32 to which they are releasably connected (FIG. 1). In this position, bottom 16 of bag 12 rests below rounded bottoms 30 of legs 28, while the remainder of legs 28 frame the inside of bag at sides 14 thereof. Yet bag 12 while being held by C-clamps 46 can still fully expand diametrically for maximum trash retention while being supported by frame 34.

Holder 22 is light in weight, simple, foldable and efficient. It can be fabricated of metal, plastic, wood or the like in various sizes to fit bags 12 of various dimensions. Since frame 34 is on the inside of bag 12, it does not restrict full expansion of bag 12 for optimum bag utility.

FIG. 5

Figure 5A:
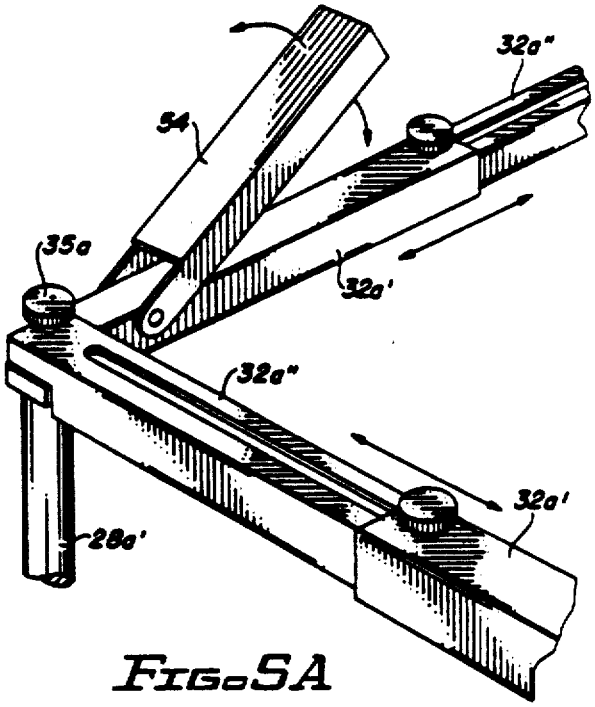
FIG. 5A is an enlarged isometric view of a corner of the unit of FIG. 5, with the bag securing member raised.
Figure 5:
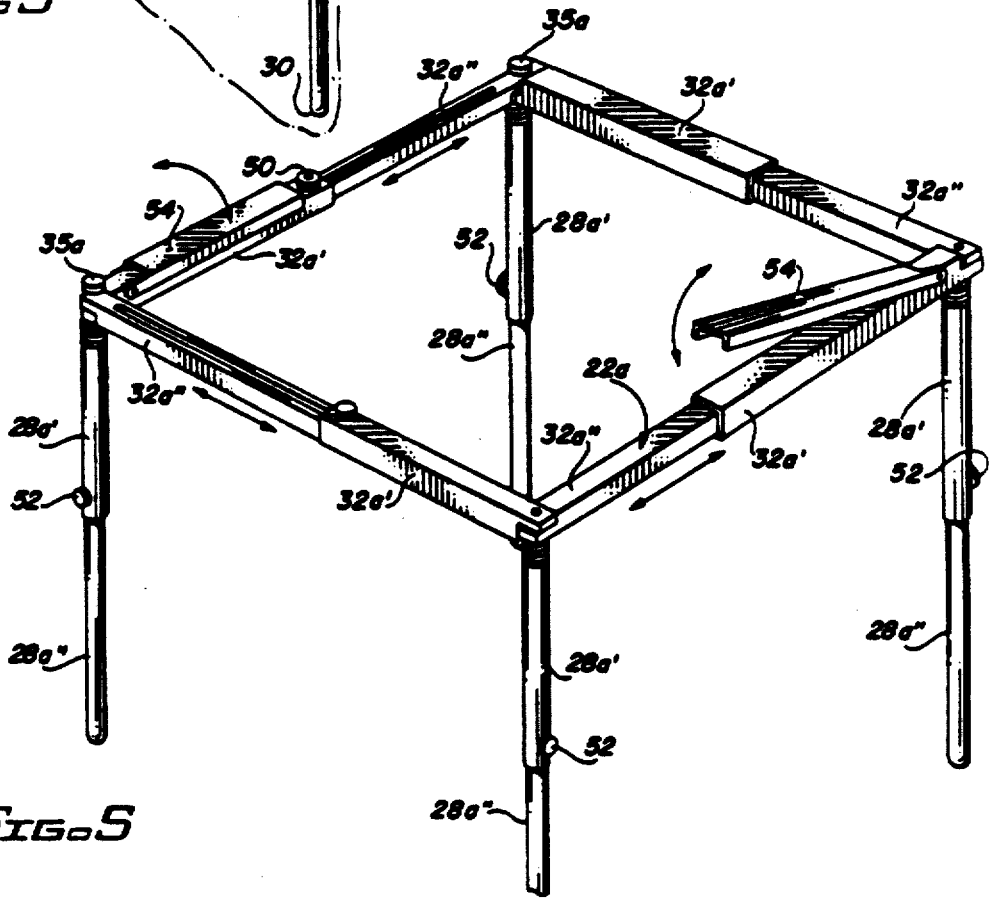
FIG. 5 is a schematic perspective view of a second preferred embodiment of the improved trash bag holder of the present invention.

A second preferred embodiment of the improved trash bag holder of the present invention is schematically depicted in FIG. 5 and in FIG. 5A. Thus, holder 22a is shown and can be used in the present assembly in bag 12, if desired, in place of holder 22. Components of holder 22a similar to those of holder 22 bear the same numerals, but are succeeded by the letter "a". Holder 22a is substantially identical to holder 22, except for the following:

(a) each arm 32a has two telescoping parts, 32a$_1$ and 32a$^{11}$ releasably locked together with a threaded screw 50 to hold them in a desired position;

(b) each leg 28a has two telescoping parts, 28a$^1$ and 28a$^{11}$ releasably locked together by a threaded screw 52 to hold them in a desired position; and two of the opposed arm portions 32a$^1$ bear flat bars 54 pivotably connected to the upper surfaces thereof and adapted to releasably lock or pinch the top 18 of bag 12 (not shown) therebetween when top 18 is lapped over arms 32a. Holder 22a has substantially the other advantages of holder 22 and can be fabricated of similar materials. If desired, bars 54 can be separable from arms 32a$^1$ and not be pivotally connected thereto.

FIG. 6

Figure 6:
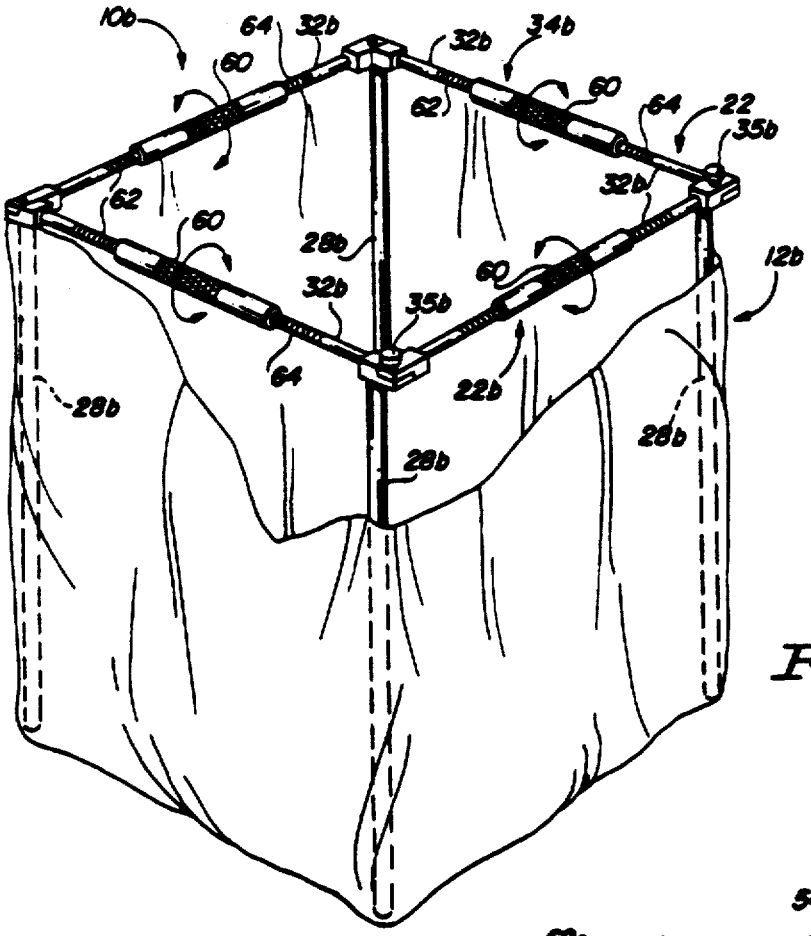
FIG. 6 is a schematic perspective view, partly broken away, of a third preferred embodiment of the improved trash bag holder of the present invention shown inside the bag of the present assembly; and, FIG. 7 is a schematic perspective view of a fourth preferred embodiment of the improved trash bag holder of the present invention.

A third preferred embodiment of the improved assembly and holder of the present invention is schematically depicted in FIG. 6. Thus, assembly 10b is shown, including bag 12b and holder 22b. Components thereof similar to those of FIGS. 1–4 or 5 bear the same numerals, but are succeeded by the letter "b". Assembly 10b is substantially identical to assembly 10, but differs therefrom only as follows:

arms 32 each include a round turnbuckle 60 into which are threaded side cylinders 62 and 64 so that rotation of turnbuckle 60 in one direction increases the length of arm 32b while rotation of turnbuckle 60 in the opposite direction decreases the length of arm 32b. Accordingly, the dimensions of frame 34b can be varied to accommodate various sizes of trash bags 12b. Holder 22b and assembly 10b have the other advantages of holder 22 and assembly 10.

FIG. 7

Figure 7:
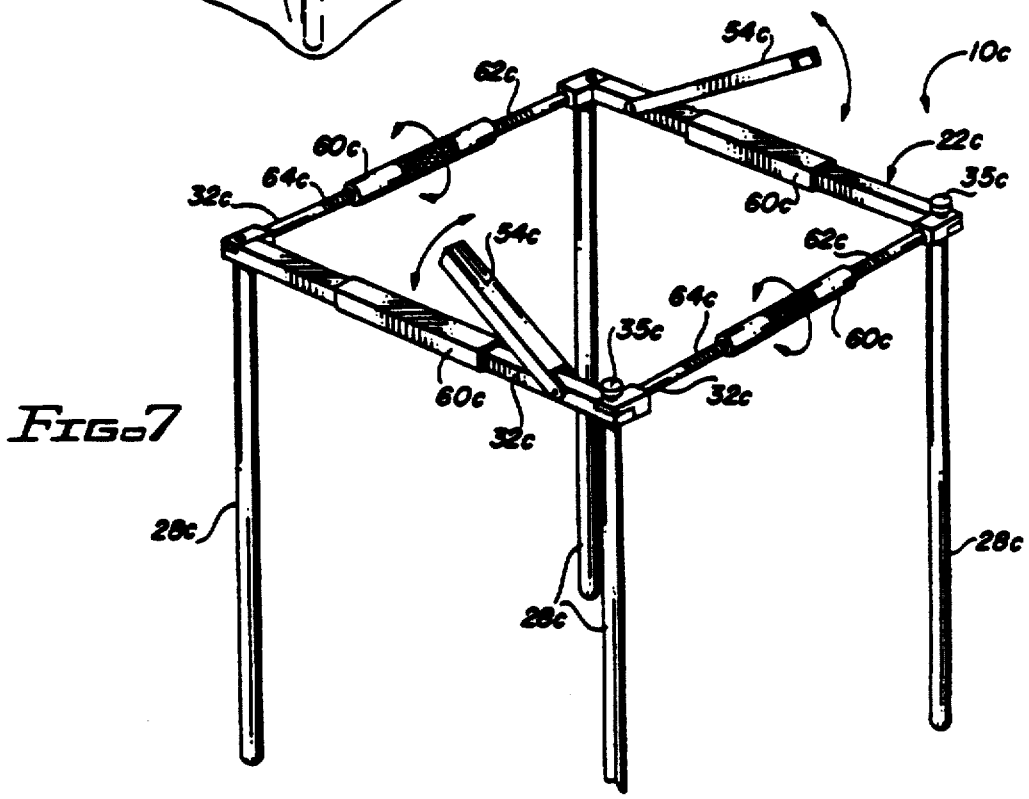

A fourth preferred embodiment of the improved trash bag holder of the present invention is schematically depicted in FIG. 7. Thus, holder 22c is shown. Components thereof similar to those of holders 22, 22a and/or 22b bear the same numerals, but are succeeded by the letter "c". Holder 22c is substantially identical to holder 22b except as follows:

(a) turnbuckles 60c are square or rectangular in transverse cross-section instead of round; and, (b) locking bars 54c are pivotably connected to the upper surfaces of two opposing arms 32c and are open bottomed, channel shaped and of similar but slightly larger transverse cross-section then turnbuckles 60c so as to slide thereover and trap trash bag top 18 (not shown) herebetween. Holder 22c has the other advantages of holder 22b.

[Various other modifications, changes, alterations and additions can be made in the improved trash bag assembly and holder of the present invention, and in their components and parameters. All such modifications, changes, alterations and additions as are within the scope of the appended claims form part of the present invention.] *Various other modifications, changes, alterations and additions can be made of the present invention, and in their components and parameters. Thus, by way of example, but not of limitation, three arms 32, with two of the arms connected at right angles at each end of a third arm, may be used to define the open centered frame of the trash bag holder. All such modifications, changes, alterations and additions as are within the scope of the appended claims form part of the present invention.*

What is claimed is:

1. An improved adjustable trash bag holder adapted to fit inside a flexible trash bag to support said bag, said holder comprising, in combination:

(a) four about horizontal arms pivotably interconnected at opposite ends thereof for movement between a collapsed folded position wherein said arms be flat against each other and facilitate insertion thereof into a flexible trash bag and an operative position wherein said arms are at about right angles to each other to form an open centered about rectangular frame for holding the interior of a trash bag in a trash-receiving position;

(b) four about vertical legs connected to and depending from opposite ends of said arms, said legs having rounded bottoms and being adapted to support said arms in an about horizontal position within a trash bag;

(c) clamp means connected to at least some of said arms to releasably secure the top of a trash bag to said arms; and (d) said legs being substantially straight and free of transverse structure which would interfere with the removal of the bag.

2. The improved holder of claim 1, wherein said holder includes releasable locking means at the ends of at least some of said arms to hold said arms in said operative position.

3. The improved holder of claim 2 wherein said releasable locking means comprise spring biased pins disposed in at least two corners of said frame for releasably interlocking the arms of said corners together.

4. The improved holder of claim 1 wherein said clamp means comprise C-clamps.

5. The improved holder of claim 1 wherein said clamp means comprise bars pivotably connected to the upper surfaces of some of said arms and adapted to releasably trap a trash bag top between said bars and adjacent arm tops.

6. The improved holder of claim 5 wherein said arms are square or rectangular in transverse cross-section and said bars are open-bottomed and channel-shaped and of similar transverse cross-section.

7. The improved holder of claim 1 wherein said holder is adjustable in size to fit the interior of trash bags of various dimensions.

8. The improved holder of claim 7 wherein at least some of said arms telescope.

9. The improved holder of claim 8 wherein said legs telescope.

10. The improved holder of claim 7 wherein said arms include turnbuckles which upon rotation increase or decrease the length of said arms.

11. The improved holder of claim 10 wherein said turnbuckles are square in transverse cross-section and wherein said clamp means comprise channel-shaped open-bottomed bars of similar cross-section pivoted to the tops of at least some of said arms.

12. An improved trash bag and holder assembly, said assembly comprising, in combination:

(a) a flexible open topped disposable trash bag; and (b) a trash bag holder disposed inside said trash bag, said holder including a frame, comprising, in combination, i. four arms pivotably interconnected at opposite ends thereof for movement between a collapsed folded position wherein said arms be flat against each other for storage and removal from said trash bag and an operative position wherein said arms are about right angles to each other to form an open-centered four-cornered configuration and hold said bag in an open trash-receiving position;

ii. four spaced vertical legs connected to said arms at said four corners and supporting said arms in a horizontal position in said bag, said legs having rounded bottoms to prevent them from tearing said bag;

iii. clamp means releasably clamping said trash bag top to said arms; and iv. said legs being substantially straight and free of transverse structure which could interfere with the removal of the bag.

13. The improved assembly of claim 12 wherein said holder includes releasable locking means of at least some of said corners to hold said arms in said operative position.

14. The improved assembly of claim 13 wherein said locking means comprises spring-biased pivot pins.

15. The improved assembly of claim 12 wherein said clamp means comprise at least one of C-clamps and bars pivotably connected to the upper surfaces of at least some of said arms and adapted to releasably trap the top of said trash bag between said clamp means and said arms.

16. The improved assembly of claim 15 wherein said arms are square or rectangular in transverse cross-section and said clamp means are open-bottomed channel-shaped bars of similar configuration to said arms.

17. The improved assembly of claim 12 wherein said holder is adjustable in size.

18. The improved assembly of claim 17 wherein said legs telescope.

19. The improved assembly of claim 17 wherein said arms include turnbuckles which upon rotation increase or decrease the length of said arms.

20. A method for disposing of trash using plastic bags and a trash holder wherein the trash holder includes (a) four about horizontal arms pivotably interconnected at opposite ends thereof for movement between a collapsed folded position wherein said arms be flat against each other and facilitate insertion thereof into a flexible trash bag and an operative position wherein said arms are at about right angles to each other to form an open centered about rectangular frame for holding the interior of a trash bag in a trash-receiving position; (b) four about vertical legs connected to and depending from opposite ends of said arms, said legs having rounded bottoms and being adapted to support said arms in an about horizontal position within a trash bag; (c) clamp means connected to at least some of said arms to releasably secure the top of a trash bag to said arms; and (d) said legs being substantially straight and free of transverse structure which could interfere with the removal of the bag;

said method comprising:

collapsing the holder and inserting it into the plastic bag with the legs extending toward the bottom of the bag;

opening the holder within the plastic bag;

locking the upper edges of the plastic bag to the horizontal arms of the holder;

filling the trash bag with trash while it is supported by the bag; and removing the holder by withdrawing it from the top of the bag, leaving the filled trash bag.

*21. An improved trash bag and holder assembly, said assembly comprising, in combination:*

*(a) a flexible open topped disposable trash bag; and*

*(b) a trash bag holder disposed inside said trash bag, said holder including a frame, comprising, in combination,*

*i. a plurality of substantially horizontal arms, wherein at least one end of each of said arms is pivotally connected to one end of another of said arms so that the arms are interconnected thereof for movement between a collapsed folded position wherein said arms be flat against each other for storage and removal from said trash bag and an operative position wherein said arms are about right angles to each other to form an open-centered four cornered configuration and hold said bag in an open trash-receiving position;*

*ii. four spaced vertical legs connected to said arms at said four corners and supporting said arms in a horizontal position in said bag, said legs having rounded bottoms to prevent them from tearing said bag;*

*iii. clamp means releasably clamping said trash bag top to said arms; and*

*iv. said legs being substantially straight and free of transverse structure which could interfere with the removal of the bag.*

*22. A method for disposing of trash using plastic bags and a trash holder wherein the trash holder includes (a) a plurality of substantially horizontal arms, wherein at least one end of each of said arms is pivotably connected to one end of another of said arms so that the arms are intercon-*

*nected thereof for movement between a collapsed folded position wherein said arms be flat against each other and facilitate insertion thereof into a flexible trash bag and an operative position wherein said arms are at about right angles to each other to form an open centered about rectangular frame for holding the interior of a trash bag in a trash-receiving position; (b) four about vertical legs connected to and depending from opposite ends of said arms, said legs having rounded bottoms and being adapted to support said arms in an about horizontal position within a trash bag; (c) clamp means connected to at least some of said arms to releasably secure the top of a trash bag to said arms; and (d) said legs being substantially straight and free of transverse structure which could interfere with the removal of the bag:*

*said method comprising:*

*collapsing the holder and inserting it into the plastic bag with the legs extending toward the bottom of the bag;*

*opening the holder within the plastic bag;*

*locking the upper edges of the plastic bag to the horizontal arms of the holder;*

*filling the trash bag with trash while it is supported by the bag; and*

*removing the holder by withdrawing it from the top of the bag, leaving the filled trash bag.*

* * * * *